(12) United States Patent
Buchholz

(10) Patent No.: US 9,007,374 B1
(45) Date of Patent: Apr. 14, 2015

(54) SELECTION AND THEMATIC HIGHLIGHTING USING TERRAIN TEXTURES

(75) Inventor: Henrik Buchholz, Michendorf (DE)

(73) Assignee: Autodesk, Inc., San Rafael, CA (US)

( * ) Notice: Subject to any disclaimer, the term of this patent is extended or adjusted under 35 U.S.C. 154(b) by 308 days.

(21) Appl. No.: 13/554,788

(22) Filed: Jul. 20, 2012

Related U.S. Application Data

(60) Provisional application No. 61/509,958, filed on Jul. 20, 2011.

(51) Int. Cl.
G06T 17/00 (2006.01)
G06T 7/40 (2006.01)

(52) U.S. Cl.
CPC ..................................... *G06T 7/408* (2013.01)

(58) Field of Classification Search
CPC ................................. G06F 17/30; G06T 17/00
USPC .......................................... 345/428, 582, 587
See application file for complete search history.

(56) References Cited

U.S. PATENT DOCUMENTS

2005/0231506 A1* 10/2005 Simpson et al. .............. 345/422
2008/0091732 A1* 4/2008 Schmidt et al. ............ 707/104.1
2010/0075643 A1* 3/2010 Cooper et al. ............. 455/414.1

OTHER PUBLICATIONS

Jeschke, S., et al., "Textured Depth Meshes for Real-Time Rendering of Arbitrary Scenes", Eurographics Workshop on Rendering, 2002, 11 pgs.
"Picking with a color buffer". Wikipedia [online], [retrieved on Jul. 20, 2012]. Retrieved from the Internet: <URL: http://wiki.processing.org/w/Picking_with_a_color_buffer>, 4 pgs.

* cited by examiner

*Primary Examiner* — Ke Xiao
*Assistant Examiner* — Weiming He
(74) *Attorney, Agent, or Firm* — Fish & Richardson P.C.

(57) ABSTRACT

Methods, systems, and apparatus, including computer programs encoded on a computer storage medium, that enable selection and individual feature highlighting in detailed three-dimensional ground infrastructure models such as, for example, three-dimensional terrain surface models that are composed from a large number of distinct ground assets such as individual roads, land parcels, and water areas.

19 Claims, 6 Drawing Sheets

Full Detail

Simplified Detail

US 9,007,374 B1

SELECTION AND THEMATIC HIGHLIGHTING USING TERRAIN TEXTURES

CROSS-REFERENCE TO RELATED APPLICATIONS

This application claims the benefit under 35 U.S.C. §119 (e) of the filing date of U.S. Patent Application Ser. No. 61/509,958 for "Selection and Thematic Highlighting Using Terrain Textures," which was filed on Jul. 20, 2011, and which is incorporated herein by reference in its entirety.

BACKGROUND

Large ground infrastructure models may not be handled by three-dimensional (3D) graphics hardware directly because the triangle count and amount of texture data are too great for real-time rendering. This problem can be addressed by a level-of-detail rendering approach. This approach strives to keep the whole terrain visible at once while still rendering in real-time. To make this possible, full accuracy and texture resolution of the terrain are only used for the terrain close to the camera. For more distant terrain, simplified representations are used. These simplified representations try to approximately resemble the appearance of the original terrain while using a significantly smaller number of triangles and less texture data.

For detailed 3D ground infrastructure models, a massive reduction of triangle count is not possible in general if the simplification has to consider and preserve any small ground asset such as curved streets separately. Therefore, a single shape with lower triangle count can be used to represent a whole terrain region at once. To preserve the appearance of individual ground assets, the overall appearance of the terrain can be captured in a texture image, which is called detail texture. A texture image is a set of pixel values, for example a pixel bitmap or a raster image. Some textures can be accessed, manipulated, and rendered by graphics hardware. One way to obtain a simplified terrain representation with corresponding detail textures is by using textured depth meshes which are described in more detail in, for example, S. Jeschke and M. Wimmer: *Textured Depth Meshes for Real-Time Rendering of Arbitrary Scenes*, Eurographics Workshop on Rendering, 2002.

An identifier (ID) buffer is a snapshot image of a rendered 3D scene that encodes object identifiers per pixel. The ID buffer is obtained by assigning individual colors to each object to be distinguished and rendering an image or "snapshot" of a 3D scene using these per-object colors. For a given mouse position and an ID buffer of the current view, object selection can be implemented by reading the pixel at the current mouse coordinates from the ID buffer and mapping the color back to the uniquely assigned ID. The ID buffer method can be used directly for sufficiently small scenes for which it is possible to render all objects as separate scene objects in order to assign colors independently.

SUMMARY

This specification relates to ground infrastructure models. A system can implement selection and highlighting of geospatial features in large ground infrastructure models by using a hierarchy of terrain ID textures that map from pixel colors to object IDs of the selected or highlighted features.

In general, one innovative aspect of the subject matter described in this specification can be embodied in methods that include the actions of obtaining a hierarchy of tiles that represents a terrain having a plurality of objects, wherein each tile in the hierarchy comprises a set of triangles, and wherein a root tile in the hierarchy represents the terrain at a lowest level of detail and other tiles in the hierarchy represent sub-regions of the terrain; for each tile at one level above leaf tiles in the hierarchy, creating a respective texture for the tile using a representation of the tile's children tiles, wherein distinct objects in the representation are each colored using a different respective color, and wherein each different pixel color in the texture identifies an object in the plurality of objects; for each tile at two or more levels above the leaf tiles in the hierarchy, creating a respective texture for the tile by sampling textures of the tile's children tiles at one level below the tile, wherein the color of each pixel of the texture identifies an object in the plurality of objects; receiving selection of a pixel in a view of the terrain; identifying a tile in the hierarchy corresponding to the selected pixel; obtaining the color of a pixel in the respective texture of the identified tile wherein the pixel corresponds to the selected pixel; and using the obtained color to identify a selected object in the plurality of objects. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Creating the respective texture for the tile by sampling textures of the tile's children tiles comprises sampling, for each pixel of the texture, one or more colors of the tile's children tiles and selecting a single color of the one or more colors as the color for the pixel. The actions include storing a distinct object identifier for each object that overlaps the identified tile, wherein using the obtained color to identify the selected object in the plurality of objects comprises mapping the obtained color to a unique object identifier. Storing a distinct object identifier for each object that overlaps the tile comprises generating an identifier table for the tile that maps from colors to object identifiers. Creating a texture comprises generating an identifier table for the parent tile, comprising enumerating a unification of objects overlapping child tiles of the parent tile; adding object identifiers to the identifier table of the parent tile for objects referenced by at least one pixel of the texture for the parent tile. The actions include rendering a tile identifier buffer, wherein each tile in the tile identifier buffer is rendered in a distinct color, wherein identifying a visible tile in the hierarchy corresponding to the selected pixel comprises identifying the distinct color of the visible tile in the tile identifier buffer. The actions include highlighting the selected object in the view of the terrain. Highlighting the selected object further comprises using a pixel shader to highlight the selected object. Inner tiles of the tile hierarchy represent simplified approximations of the terrain. The representation of the tile's children tiles is an orthographic snapshot image of the tile's children tiles.

Particular embodiments of the subject matter described in this specification can be implemented so as to realize one or more of the following advantages. Individual terrain objects are separately accessible for selection and highlighting at any distance from a camera. This allows for interactive selection tools as well as for thematic highlighting based on underlying feature attributes regardless of the distance of a given object from the camera. Interactive selection and rendering can be achieved even for ground infrastructure models with large numbers of objects.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The conventional ID buffer technique does not consider large scenes and level-of-detail rendering. Therefore, it cannot be used for large ground infrastructure models, particularly due to the following aspects:

Feature Count: A large scene containing each small feature separately would significantly slow down rendering.

Geometry Simplification: A massive reduction of geometric complexity requires merging several shapes together so that object identity is lost. A single triangle of a simplified tile may overlap parts of different features.

ID Bitwidth: In general, a 32-Bit color value is not sufficient to uniquely encode an arbitrary object ID.

Described herein is an extension of conventional terrain rendering techniques that enables selection and individual feature highlighting in detailed 3D ground infrastructure models, i.e. 3D terrain surface models that have a large number of distinct ground assets such as individual roads, land parcels, and water areas.

Figure 1A:
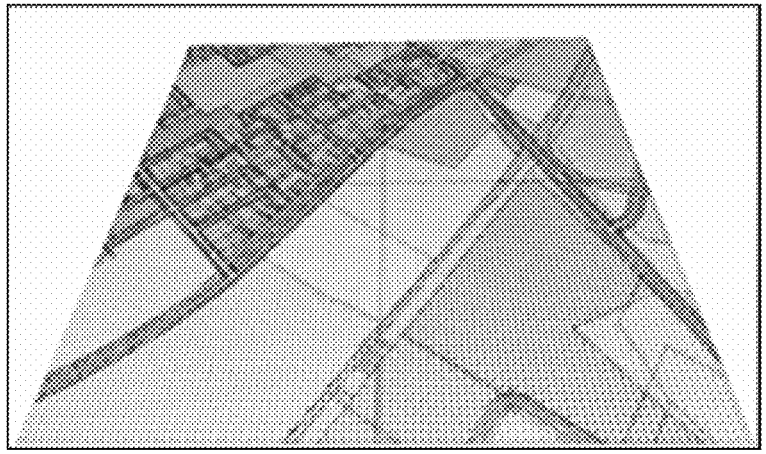
FIG. 1A shows a comparison of a portion of terrain at full detail and a simplified representation used for distant terrain.
Figure 1A:
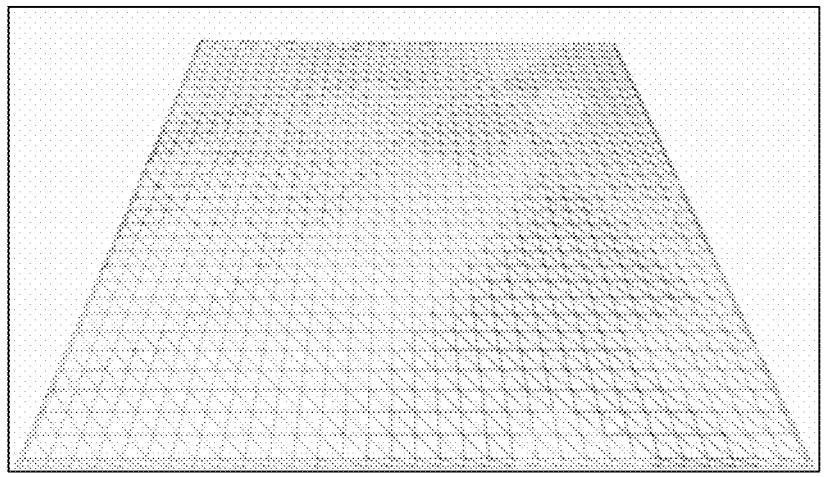

FIG. 1A shows a comparison of a portion of terrain at full detail and a simplified representation used for distant terrain. To obtain object identifiers at any level of resolution, object identifiers can be stored in multi-resolution terrain textures which are mapped onto simplified terrain geometry. An ID texture stores a unique object identifier per pixel and can be managed in the same way as conventional terrain textures (e.g., aerial images). This makes it possible to represent several thousand objects at once using a small number of textured triangles. Features that fall below the pixel scale on a display device are automatically filtered out so that the amount of ID data to be handled in real-time is naturally bounded at any perspective.

This section gives a short explanation of some terms used in this specification.

3D Model: A set of 3D triangles with associated materials. A material may be a color or a texture that is applied to a subset of the triangles and determines their appearance.

Ground Asset: The term ground asset denotes a 3D model that forms a part of a detailed 3D model of a terrain (or "terrain"). Each ground asset is associated with an underlying geospatial feature and is represented by a corresponding object in an underlying database. Examples of ground asset objects include 3D models of roads, land parcels, vegetation areas, or any other classification that can be associated with a part of a terrain surface model.

3D Ground Infrastructure Model: A detailed 3D model of a terrain composed from a (typically large) number of separate ground assets.

ID: An identifier that uniquely defines a geospatial feature in a database. For example, an ID may consist of a 16-Bit database table index and a 64-Bit index of a row in this table. An ID may additionally encode single feature parts such as separate lanes of a road. In general, an ID is a name that uniquely identifies an object. An identifier can consist of one or more letters, numbers, symbols, or combinations of these.

Selection: If the user selects a ground asset in a rendering of a 3D model of a terrain using a computer mouse, for example, the software application that the user is interacting with has to efficiently find out which ground asset of the terrain has been selected. That is, given a pixel coordinate on the rendering, the problem is to efficiently determine the ID of the ground asset visible at that pixel. Solving this problem is denoted here as "selection."

Figure 1B:
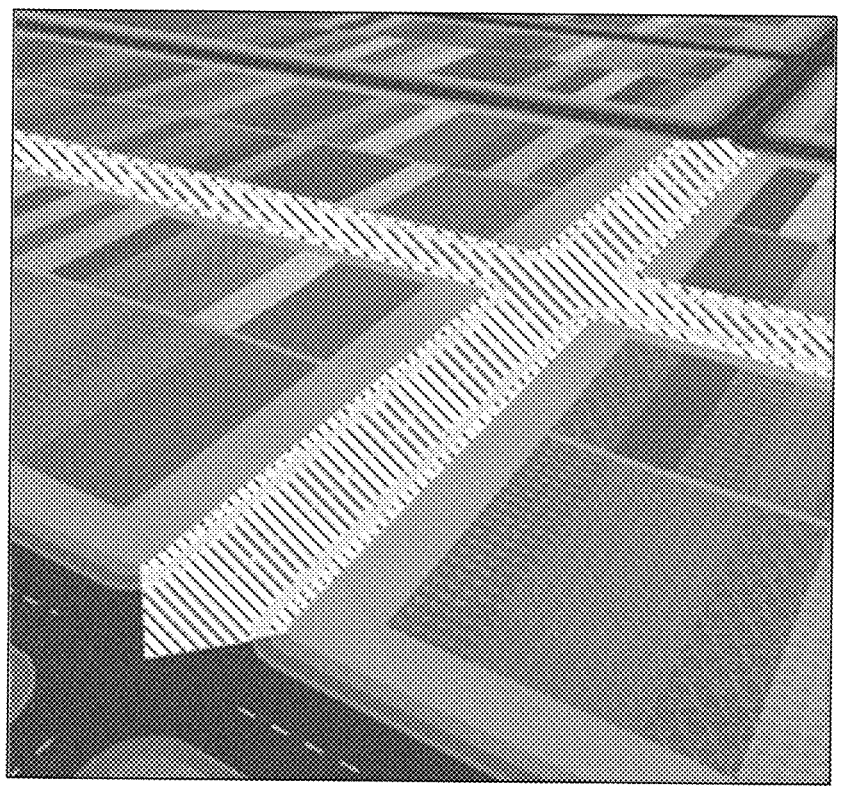
FIG. 1B shows an example of a road that has been highlighted.

Highlighting: Given an ID of a feature f, the goal is to visually highlight this feature in the 3D view of a terrain. That is, the color has to be modified for all pixels covered by the corresponding ground asset. One way to do this is by blending the original pixel color with an associated highlighting color assigned to f. FIG. 1B shows an example of a road ground asset that has been highlighted, indicated by the hatched region.

Thematic Highlighting: Thematic highlighting comprises assigning highlighting colors to individual ground assets. These colors are determined based on properties of the underlying geospatial features.

Figure 2:
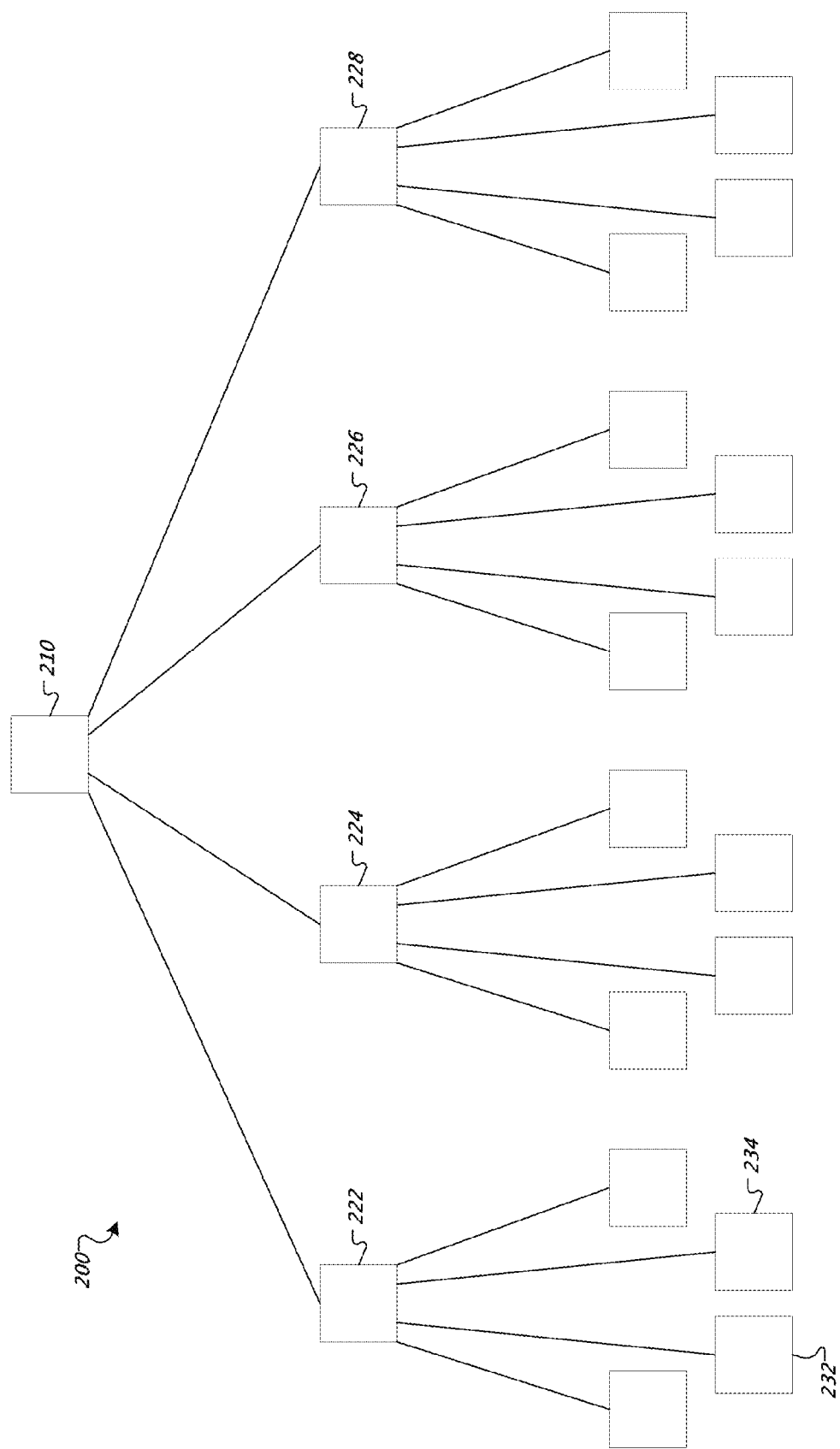
FIG. 2 is an example diagram of a hierarchy of tiles represented by a tree structure.

FIG. 2 is a diagram of a hierarchy of tiles represented by a tree structure 200. A rendering engine is a hardware or software component that needs a data structure to efficiently obtain terrain representations at different levels of detail. For this, a hierarchical organization of terrain geometry and texture data can be represented by a tree structure. A tile is a set of triangles representing a sub-region of the terrain, bounded by an axis-aligned rectangle in the horizontal plane. The tile hierarchy defines a recursive subdivision of the full terrain area: the root node 210 (level 0) represents the terrain at a lowest level of detail, and can represent the full terrain. For an inner node at tree level l, the 4 children at level l+1 subdivide its area into four parts of equal size. For example, each of the inner nodes 222, 224, 226, and 228 subdivide the area represented by the root node 210 into equal parts.

The leaf nodes of the hierarchy, e.g. leaf nodes 232 and 234, contain the terrain geometry and textures at maximum available detail. Inner tiles on the other hand contain simplified approximations of the terrain geometry and textures.

From one level l to the parent level l−1, the geometric complexity is reduced in a way that the parent tile has approximately the same triangle count and texture data as a single of its child tiles. The triangle count per tile can be chosen sufficiently small so that a fixed number of tiles (e.g. 50 tiles) can always be rendered efficiently, independent of which tiles are chosen. The tile hierarchy can be pre-computed and stored on hard disk.

Streaming and Rendering

The rendering engine controls which terrain tiles are loaded and used for rendering. Based on the tile hierarchy, the rendering engine maintains an appropriate set of tiles for rendering that provide a terrain representation that is:

a) Simple: The triangle count and texture data are small enough to enable fast rendering.

b) Complete: The whole terrain area is represented (unless parts outside the view frustum).

c) Sufficient: When looking from the current camera position, the visual difference compared to the result that would be obtained from rendering the terrain at full detail should be as small as possible.

Leaf tiles are used to represent the terrain regions close to the camera. With increasing camera distance, the tiles are chosen with gradually decreasing level-of-detail, i.e. less accurate geometry and lower texture resolution. This is achieved by using tiles from lower tree levels, which represent large parts of terrain using a small triangle count and low texture resolution.

Figure 3:
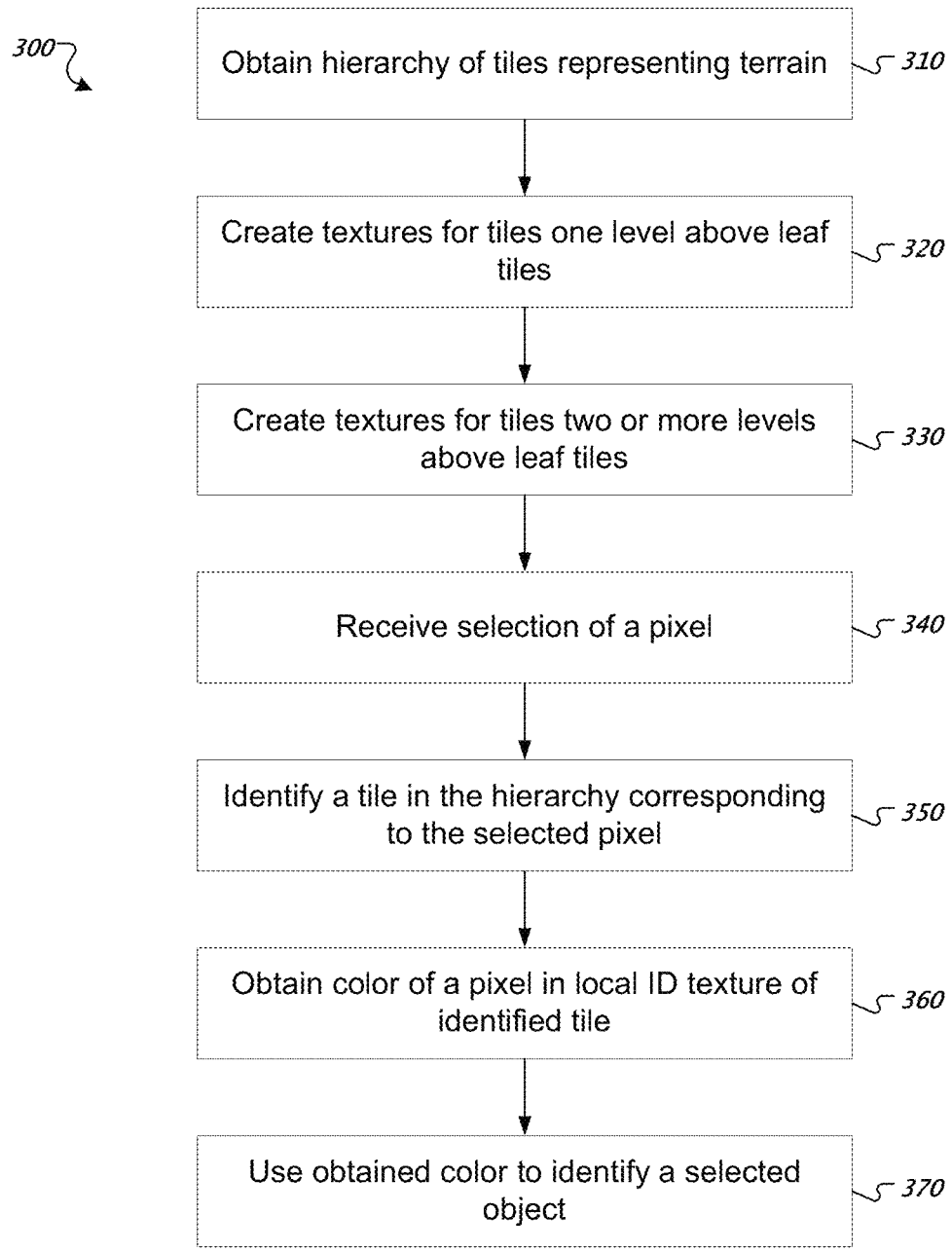
FIG. 3 is a flow chart of an example process for using terrain textures to support selection and highlighting.

FIG. 3 is a flow chart of an example process 300 for using terrain textures to support selection and highlighting. The process 300 includes preprocessing steps and run-time steps used for rendering. The preprocessing step creates additional object ID data for each tile of the hierarchy. These object IDs enable the system to associate any point on the terrain surface with a corresponding object ID. At runtime, the terrain rendering engine is exploited to control which object IDs are loaded and used. During rendering, object IDs are accessed by customized shaders to implement selection and highlighting. The process 300 will be described as being performed by an appropriately programmed computing system of one or more computers.

The system obtains a hierarchy of tiles representing terrain (310).

Preprocessing

The goal of the preprocessing step is to provide ID data for each tile of the hierarchy. ID data for features that overlap a tile must share the essential characteristics of its geometry and texture data, i.e.

The leaf tiles must provide ID data for tile features at a highest level of accuracy.

Generated ID data must cover all object IDs of objects overlapping the tile region.

The amount of ID data per tile must be restricted independent of tile region extent. If the amount of ID data would arbitrarily grow in the lower hierarchy levels, efficient streaming of tiles may not be possible anymore.

The ID data for each tile is computed in three steps:

1. For leaf tiles of the geometry hierarchy, object IDs for tile features are stored using individual per-feature colors.
2. One level above the leaf tiles, IDs are stored by creating ID textures at high spatial resolution.
3. For the remaining levels above, IDs are computed bottom up by combining and down-sampling ID textures of child tiles.

The following paragraphs explain these steps in more detail.

Generating ID Data for Leaf Tiles

A leaf tile of the terrain geometry hierarchy covers only a fraction of the whole terrain. By construction, this fraction is chosen sufficiently small to enable fast rendering of the original terrain geometry. This implies that only a small number of features are overlapping the tile so that they can be rendered separately without performance problems. A feature can be said to overlap a tile when at least a portion of the feature is located in a terrain region defined by the tile. The terrain rendering engine ensures that leaf tiles are only used within a limited camera distance, so that only a small number of leaf tiles will be used at once. For the reasons given above, leaf terrain tiles can be rendered using the conventional ID buffer approach, i.e. by assigning individual colors to each feature. For this, the system needs a way to encode an arbitrary object ID into a 32-Bit color.

Let $f_0, \ldots, f_{n-1}$ be an enumeration of the features overlapping the tile T. Within T, each feature $f_i$ can be uniquely addressed by its index i, which can be used to locate the object ID of feature $f_i$. This index is called tile-local ID. To choose the ID buffer color for each feature $f_i$, an invertible 1:1 mapping from integer values to colors is used. Using RGBA format with 8 Bits per channel, each color channel can store an 8-Bit group of a tile-local IDs—assuming a maximum bit-width of 32 for tile-local IDs. The value of n may be usually small by construction so that 32 bits are sufficient.

To provide object ID data for a leaf tile, the additional information stored with the geometry of each leaf tile is:

ID Colors: Individual colors assigned to each ground asset.
   ID Table: An enumeration $f_0, \ldots, f_{n-1}$ of tile-local IDs enlisting the features whose geometry intersects the tile. This table allows translating ID colors back to complete object IDs, which may have 96 Bits or more.

Generating ID Textures

The system creates textures for tiles one level above leaf tiles (320). As described above, leaf tiles of the geometry hierarchy do not need ID textures. Therefore, the ID texture hierarchy begins one level above leaves of the geometry hierarchy. The next step is to create an ID texture for each tile T that is a direct parent of a leaf tile. If R is the rectangular region represented by T, the system creates an orthographic ID Buffer snapshot from above that exactly captures the tile region. For this, the system specifies a parallel projection so that The camera is horizontally centered at the midpoint of R.
   The camera is located above the terrain and looking vertically down.
   The width and height of the ID buffer snapshot are set to the extents of R.

As described in the previous section, the system creates an ID table $f_0, \ldots, f_{n-1}$ enumerating the features overlapping T and encode the tile-local ID of each feature in the shape color. The ID buffer snapshot is rendered at a fixed resolution that can be efficiently handled by current graphics hardware, e.g. 512×512 pixels.

Note that T comprises only four leaf tiles of the terrain geometry hierarchy. Therefore, the associated terrain region R is still small enough, so that 32 Bit is sufficient to store tile-local IDs
   The ID buffer snapshot can be rendered without problems due to scene complexity.
   The fixed ID texture resolution is sufficient to capture object IDs at a reasonably high spatial resolution.

This step produces the following data for a tile:

An ID texture: An image containing color-coded tile-local IDs in each pixel. The ID texture matches the region of the tile and can be orthogonally mapped back onto terrain.
   An ID table: An enumeration $f_0, \ldots, f_{n-1}$ of tile-local IDs enlisting the features whose geometry intersects the tile. This table allows translating ID colors back to complete object IDs.

Generating ID Textures of Parent Tiles

The system creates textures for tiles two or more levels above leaf tiles (330). The previous steps created ID data for leaf tiles and one level above. For all remaining tiles of the hierarchy, the ID data are obtained by bottom-up propagation by generating an ID texture and an ID table for a tile T based on the corresponding data of its four child tiles.

Similar to conventional terrain textures, the parent ID texture can be obtained by down-sampling each of the four child textures by a factor of 2 and composing the results to a single parent texture. However, merging ID colors would result in random IDs and can be avoided by using a nearest-filter that selects one of the multiple candidate ID colors.

Before composing the down-sampled child textures, the colors must be remapped: Initially, the interpretation of a color encoding a tile-local ID i will be different for each child tile. The parent ID texture colors must encode unique tile-local IDs of the parent ID table. The ID table of the parent tile is obtained by enumerating the unification of all IDs of the child ID tables.

To avoid ID tables growing arbitrarily, an object ID of a child table is only added to the parent table if it is referenced by at least one pixel of the down-sampled ID texture. In this way, the length of the ID table at any tile size is naturally bounded by the number of pixels in the ID texture. The effect of this reduction is that the IDs of some features are dropped if they cover only a very small percentage of the tile area. If the ID texture resolution matches the resolution of the detail texture, this will only affect features that are too small to be explicitly recognizable in the visualization.

After this step, the ID texture and ID table are available for each tile of the hierarchy.

Runtime Algorithm

To implement selection and highlighting, a management of ID data is needed to make sure that they are available. This system can ensure that:
- ID data is always available for each surface point of the terrain.
- The amount of ID data in use is sufficiently small to enable ID buffer rendering in real-time.
- ID data is accurately provided for tiles close to the camera while the accuracy may be decreased with increasing camera distance.

To achieve these objectives, streaming and caching of tile ID data can be directly coupled with geometry and texture data of tiles, i.e. whenever the content of a tile is loaded, stored in memory or uploaded to graphics memory for rendering, the same is done for the attached ID data. In this way, the complete workflow of streaming, caching, and level-of-detail control can be implicitly handled by the terrain rendering engine.

Implementing Selection

At runtime, the terrain geometry is represented by a set of tiles that have been selected by the terrain rendering engine for rendering the current frame. The set of tiles selected by the terrain rendering engine can include leaf tiles, parent tiles, or both. To obtain a corresponding ID buffer for the current view, the system renders the tiles using their attached ID colors. That is,
- All visible leaf-tiles of the terrain geometry are colored using their precomputed per-feature colors.
- Other tiles are textured using their respective ID textures.

The texture coordinates can be chosen in a way that the ID texture exactly matches the tile, e.g. the texture is mapped to the same region from which its pixels had been initially captured during preprocessing. All ID textures can be used directly without any remapping of the ID colors.

The ID buffer obtained, called Local-id buffer, contains tile-local IDs, which are unique only within a single tile.

To obtain fully unique IDs, a second ID buffer, called Tile-id buffer, can be rendered in parallel into a separate render target. In the tile-id buffer, each tile is rendered at a uniform color. This color encodes an identifier that uniquely addresses the tile within the full tile hierarchy. For each tile used for rendering, the ID table is loaded as well.

The system receives a selection of a pixel (340). The system identifies a tile in the hierarchy corresponding to the selected pixel (350). The corresponding tile ID for given selected pixel coordinates (x, y) can be obtained by getting the color of the pixel at coordinate (x, y) in the tile-id buffer, which will map to a particular tile ID. The system can then access the local-id texture of the identified tile corresponding to the particular tile ID.

The system obtains the color of the selected pixel in the local-id texture of the identified tile (360). The system gets the color of the pixel at coordinate (x, y) in the local-id texture of the identified tile.

The system uses the obtained color to identify a selected object (370). The system gets the color of the selected pixel in the local-id texture, which map to the globally-unique object ID of a selected object in the current view.

Implementing Highlighting

Figure 4:
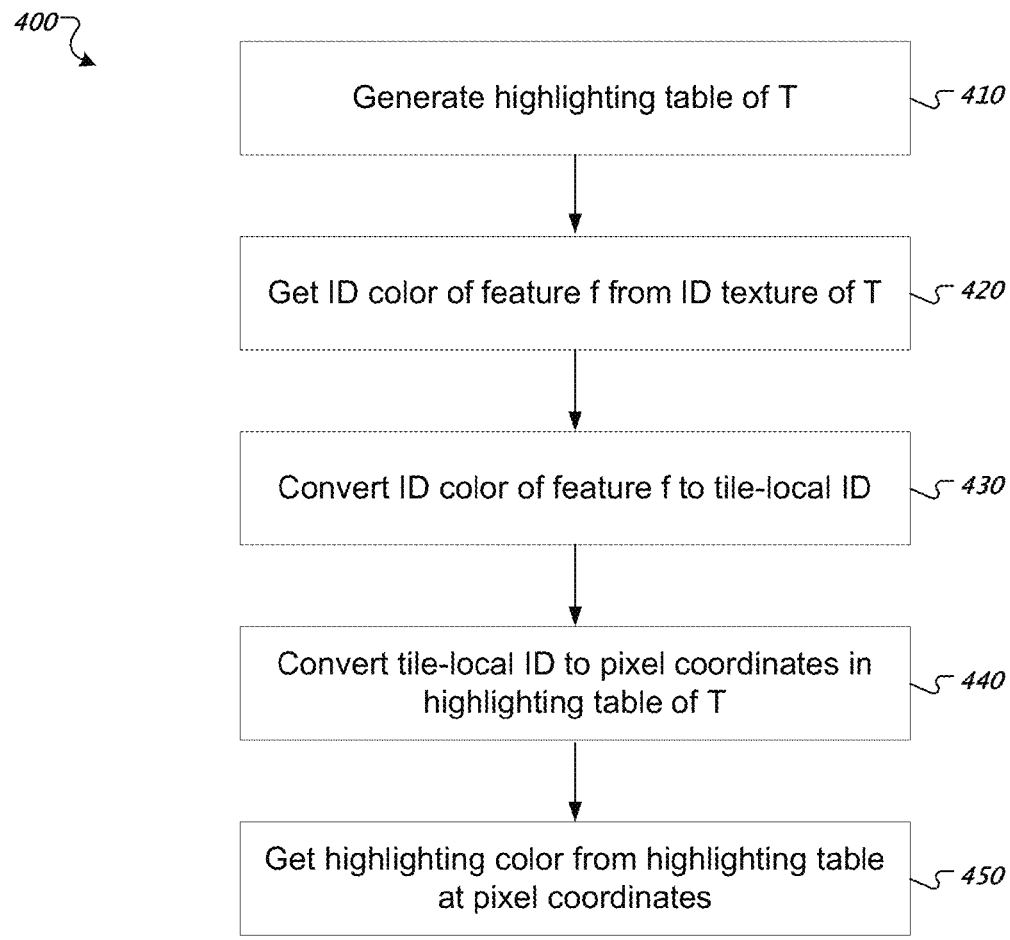
FIG. 4 is a flow chart of an example process for implementing highlighting using ID textures.

FIG. 4 is a flow chart of an example process 400 for implementing highlighting using ID textures. Given an arbitrary application-provided highlighting function H that maps an object ID f to an assigned highlighting color c=H(f), the goal is to blend all screen pixels with the color c at which f is visible.

To achieve this, a highlighting mask can be computed, e.g. a texture at the resolution of the rendering window that contains at each pixel (x, y) the highlighting color defined by the feature visible at this pixel. Pixels that are not covered by highlighted features can be set to be fully transparent in the highlighting mask. To apply highlighting, the 3D scene can be rendered into an offscreen target and finally blended with the highlighting mask texture. The process 400 can efficiently obtain a highlighting mask for each rendered frame. The process 400 will be described as being performed by an appropriately programmed computing system of one or more computers.

The system generates a highlighting table for a tile T (410). In theory, each pixel (x, y) of the highlighting mask could be simply obtained based on selection by:
- Determining an object ID f of the feature visible at a pixel (x, y) as described in the previous paragraph.
- Compute highlighting function H(f) to obtain associated highlighting color.

However, doing this for each pixel and each frame would significantly slow-down rendering. To accelerate this, a pixel shader is used that computes the highlighting table directly from the local IDs as explained below.

By definition, the tile-local IDs of a single tile T form a range of consecutive numbers 1, . . . , n−1 where n is the number of features $f_0, \ldots, f_{n-1}$ in the tile. To evaluate highlighting for the features in T, it is sufficient to know a tile-local highlighting function $H_T(i)$ which maps a tile-local ID i to the highlighting color returned by $H(f_i)$. The values of $H_T(0), \ldots, H_T(n)$ can be evaluated and cached in a small squared texture called highlighting table. For each tile-local ID i, the highlighting table contains the corresponding highlighting color at pixel coordinates (i% w, i/w), where w is the size of the highlighting table. The system can choose w as the smallest power of 2 such that $w^2 \geq n$.

To compute the highlighting mask, the terrain is rendered using a custom shader. For rendering the geometry of a tile T, the custom shader takes the following input:

ID texture of a tile T.

Highlighting table of T, which provides a highlighting color for each feature in T.

The system gets the ID color of a feature f from the ID texture of T (420). The feature f to be highlighted can, for example, be a feature selected by a user of the system.

The system converts the ID color of the feature f to a tile-local ID (430). The tile-local ID can be obtained from the ID table of the tile T.

The system converts the tile-local ID to pixel coordinates (x, y) in the highlighting table of T (440). The system computes a mapping from the tile-local ID to the pixel coordinates in the highlighting table, for example, using the mapping from a tile-local ID I to pixel coordinates described above: (i % w, i/w).

The system gets the highlighting color from the highlighting table at pixel coordinates (x,y) (450). By obtaining the highlighting colors from the highlighting table, the shader can compute the highlighting mask to be used for highlighting the feature f.

For leaf tiles without ID textures, a slightly different shader variant can be used that obtains the ID color per shape as a constant shader parameter instead.

In this way, for a single tile T, a highlighting color can be applied to all pixels of a feature f by setting a single pixel in the highlighting table of T. The shader makes sure that this pixel is written to the highlighting mask at any pixel covered by f.

When rendering and blending the highlighting mask for each frame as described above, the procedure to apply a highlighting color c to a feature f in the whole scene is:

Among all tiles that are currently available for rendering, find the tile(s) containing f.

For each of these tiles . . . .
Find the tile-local ID corresponding to f
Convert it to pixel coordinates in the highlighting table
Set this pixel to c.

Highlighting tables are only needed for a limited number of tiles that are currently directly available for rendering. Therefore, the search step above has only to be done within a small set of tiles and can be efficiently implemented.

Note that the scene content may change at any time due to the level-of-detail management and streaming. The system can ensure that highlighting is applied consistently with changing level-of-detail. For example, when selecting a road and zooming in close to it afterwards, the system can highlight the detailed road as well although it was likely not in memory yet when the highlighting was set.

To solve this, the highlighting tables can be created and initialized during streaming by setting each pixel to the latest highlighting state defined by the H. This step can occur when a tile is prepared for rendering by uploading geometry and textures to the graphics memory. Note that highlighting tables are comparatively small, so that (as long as H can be evaluated fast enough) this step is not a critical performance blocker compared to the GPU upload of tile geometry and texture data that have to be done at the same frequency.

One advantage of this streaming update is that bulk updates that affect a large number of features at once are only necessary for the content that is currently in use. For instance, when applying a thematic highlighting that affects five million features in the database while navigating close to the ground so that only 100 ground assets are visible, these assets will be updated quickly by deferring the updates of unloaded tiles.

Figure 5:
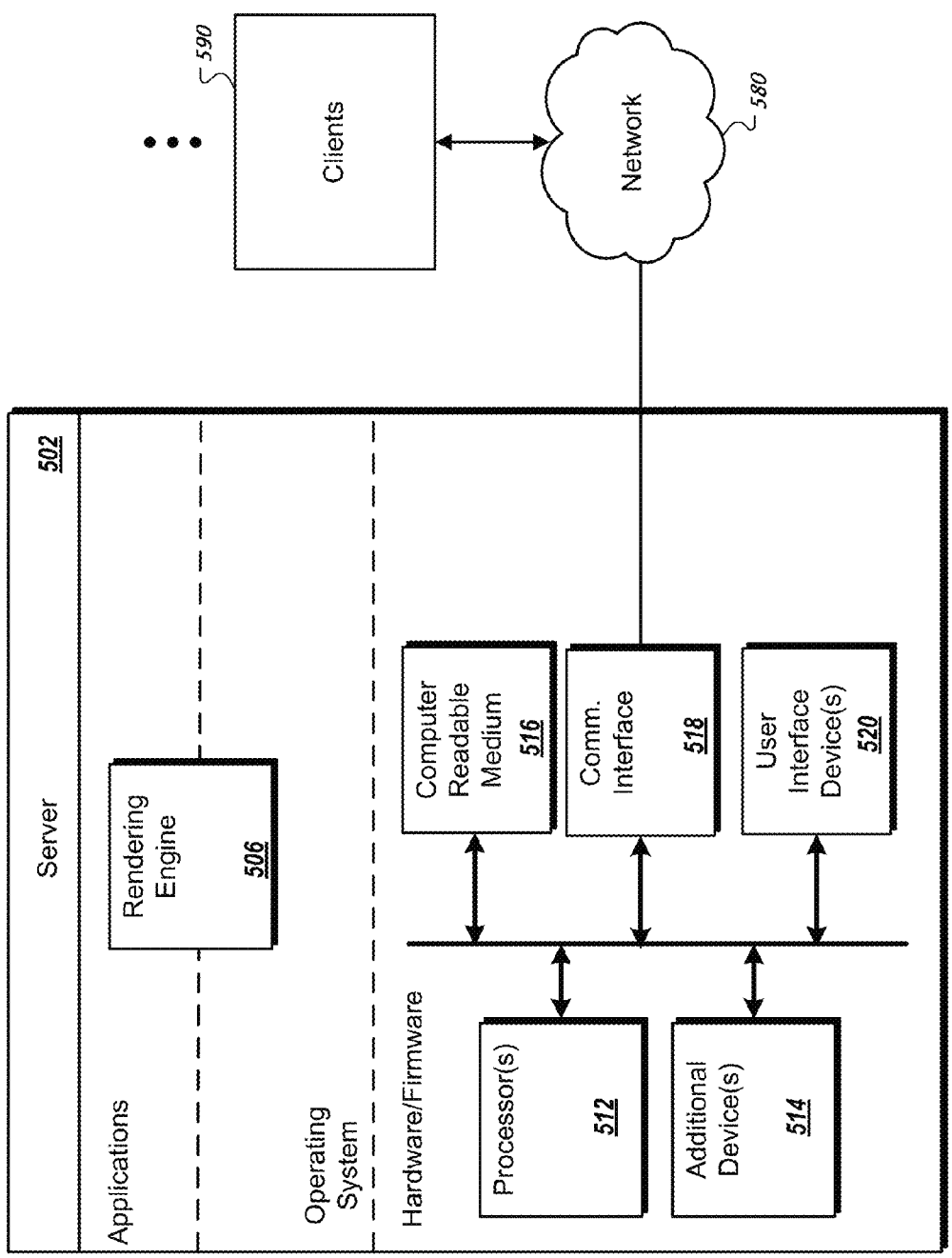
FIG. 5 is a schematic diagram of an example system.

FIG. 5 is a schematic diagram of an example server 502. The server 502 is optionally connected to one or more user or client computers 590 through a network 580. The server 502 consists of one or more data processing apparatuses. While only one data processing apparatus is shown in FIG. 5, multiple data processing apparatus can be used. The server 502 includes various software engines or modules, e.g. executable software programs or libraries, including a rendering engine 506. Although several software modules are illustrated, there may be fewer or more software modules. Moreover, the software modules can be distributed on one or more data processing apparatus connected by one or more networks or other suitable communication mediums.

The server 502 also includes hardware or firmware devices including one or more processors 512, one or more additional devices 514, a computer readable medium 516, a communication interface 518, and one or more user interface devices 520. Each processor 512 is capable of processing instructions for execution within the server 502. In some implementations, the processor 512 is a single or multi-threaded processor. Each processor 512 is capable of processing instructions stored on the computer readable medium 516 or on a storage device such as one of the additional devices 514. The server 502 uses its communication interface 518 to communicate with one or more computers 590, for example, over a network 580. Examples of user interface devices 520 include a display, a camera, a speaker, a microphone, a tactile feedback device, a keyboard, and a mouse. The server 502 can store instructions that implement operations associated with the modules described above, for example, on the computer readable medium 516 or one or more additional devices 514, for example, one or more of a floppy disk device, a hard disk device, an optical disk device, or a tape device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A data processing apparatus implemented method comprising:
    obtaining a hierarchy of tiles that represents a terrain having a plurality of objects, wherein each tile in the hierarchy comprises a set of triangles, wherein leaf tiles in the hierarchy of tiles represent the terrain at a highest level of detail, and wherein a root tile in the hierarchy represents the terrain at a lowest level of detail and other tiles in the hierarchy represent sub-regions of the terrain;
    generating a hierarchy of ID textures corresponding to the hierarchy of tiles, each ID texture in the hierarchy of ID textures corresponding to a tile in the hierarchy of tiles, wherein each ID texture in the hierarchy of ID textures is an image whose color values encode object identifiers of objects included in the corresponding tile in the hierarchy of tiles, including:
        for each tile at one level above leaf tiles in the hierarchy of tiles, creating a respective ID texture for the tile including assigning a color value of each coordinate in the ID texture to a local object identifier of an object included in the tile at a location in the tile corresponding to the coordinate in the ID texture, and
        for each tile at two or more levels above the leaf tiles in the hierarchy of tiles, creating a respective ID texture for the tile by sampling color values of ID textures in the hierarchy of ID textures that correspond to the respective tile's children tiles that are at one level below the respective tile;
    generating, for each ID texture in the hierarchy of ID textures, an ID table of object identifiers for the ID texture, wherein the ID table of object identifiers maps each color value of the ID texture to a full object identifier;
    receiving a selection of a pixel in a rendered view of the terrain;
    identifying a tile in the hierarchy of tiles corresponding to the selected pixel;
    identifying an ID texture in the hierarchy of textures corresponding to the identified tile;
    obtaining a color value in the identified ID texture corresponding to the selected pixel; and
    using the obtained color value as an index into an ID table of object identifiers for the ID texture to identify a full object identifier of a selected object in the plurality of objects.

2. The method of claim 1, wherein creating the respective ID texture for the tile by sampling textures of the tile's children tiles comprises sampling, for each coordinate of the ID texture, one or more colors of the ID texture's children and selecting a single color of the one or more colors as the color for the coordinate of the ID texture.

3. The method of claim 1, wherein generating an ID table of object identifiers for the ID texture comprises:
    enumerating objects included in tiles corresponding to child ID textures of the ID texture; and
    adding full object identifiers to the ID table of the ID texture for objects referenced by at least one pixel of the ID texture.

4. The method of claim 1, wherein identifying an ID texture in the hierarchy of ID textures corresponding to the identified tile comprises:
    obtaining a set of tiles selected by a terrain rendering engine for rendering the view of the terrain;
    obtaining a plurality of ID textures corresponding to the set of tiles selected by the terrain rendering engine;
    rendering a tile identifier buffer using the plurality of ID textures, wherein each tile in the tile identifier buffer is rendered uniformly in a distinct color that distinctly identifies a particular ID texture of the plurality of ID textures; and
    determining a color in the tile identifier buffer that corresponds to the location of the selected pixel.

5. The method of claim 1, further comprising highlighting the selected object in the view of the terrain.

6. The method of claim 5, wherein highlighting the selected object further comprises using a pixel shader to highlight the selected object.

7. The method of claim 1 wherein inner tiles of the tile hierarchy represent simplified approximations of the terrain.

8. The method of claim 1, wherein the representation of the tile's children tiles is an orthographic snapshot image of the tile's children tiles.

9. A system comprising:
    one or more data processing apparatus; and
    a computer-readable storage device having stored thereon instructions that, when executed by the one or more data processing apparatus, cause the one or more data processing apparatus to perform operations comprising:
    obtaining a hierarchy of tiles that represents a terrain having a plurality of objects, wherein each tile in the hierarchy comprises a set of triangles, wherein leaf tiles in the hierarchy of tiles represent the terrain at a highest level of detail, and wherein a root tile in the hierarchy represents the terrain at a lowest level of detail and other tiles in the hierarchy represent sub-regions of the terrain;
    generating a hierarchy of ID textures corresponding to the hierarchy of tiles, each ID texture in the hierarchy of ID textures corresponding to a tile in the hierarchy of tiles, wherein each ID texture in the hierarchy of ID textures is an image whose color values encode object identifiers of objects included in the corresponding tile in the hierarchy of tiles, including:
        for each tile at one level above leaf tiles in the hierarchy of tiles, creating a respective ID texture for the tile including assigning a color value of each coordinate in the ID texture to a local object identifier of an object included in the tile at a location in the tile corresponding to the coordinate in the ID texture, and
        for each tile at two or more levels above the leaf tiles in the hierarchy of tiles, creating a respective ID texture for the tile by sampling color values of ID textures in the hierarchy of ID textures that correspond to the respective tile's children tiles that are at one level below the respective tile;
    generating, for each ID texture in the hierarchy of ID textures, an ID table of object identifiers for the ID texture, wherein the ID table of object identifiers maps each color value of the ID texture to a full object identifier;
    receiving a selection of a pixel in a rendered view of the terrain;
    identifying a tile in the hierarchy of tiles corresponding to the selected pixel;
    identifying an ID texture in the hierarchy of textures corresponding to the identified tile;
    obtaining a color value in the identified ID texture corresponding to the selected pixel; and
    using the obtained color value as an index into an ID table of object identifiers for the ID texture to identify a full object identifier of a selected object in the plurality of objects.

10. The system of claim 9, wherein creating the respective ID texture for the tile by sampling textures of the tile's children tiles comprises sampling, for each coordinate of the ID texture, one or more colors of the ID texture's children and selecting a single color of the one or more colors as the color for the coordinate of the ID texture.

11. The system of claim 9, wherein generating an ID table of object identifiers for the ID texture comprises:
enumerating objects included in tiles corresponding to child ID textures of the ID texture; and
adding full object identifiers to the ID table of the ID texture for objects referenced by at least one pixel of the ID texture.

12. The system of claim 9, wherein identifying an ID texture in the hierarchy of ID textures corresponding to the identified tile comprises:
obtaining a set of tiles selected by a terrain rendering engine for rendering the view of the terrain;
obtaining a plurality of ID textures corresponding to the set of tiles selected by the terrain rendering engine;
rendering a tile identifier buffer using the plurality of ID textures, wherein each tile in the tile identifier buffer is rendered uniformly in a distinct color that distinctly identifies a particular ID texture of the plurality of ID textures; and
determining a color in the tile identifier buffer that corresponds to the location of the selected pixel.

13. The system of claim 9, wherein the operations further comprise highlighting the selected object in the view of the terrain.

14. The system of claim 13, wherein highlighting the selected object further comprises using a pixel shader to highlight the selected object.

15. The system of claim 9, wherein the representation of the tile's children tiles is an orthographic snapshot image of the tile's children tiles.

16. A computer-readable storage device having stored thereon instructions, which, when executed by data processing apparatus, cause the data processing apparatus to perform operations comprising:
obtaining a hierarchy of tiles that represents a terrain having a plurality of objects, wherein each tile in the hierarchy comprises a set of triangles, wherein leaf tiles in the hierarchy of tiles represent the terrain at a highest level of detail, and wherein a root tile in the hierarchy represents the terrain at a lowest level of detail and other tiles in the hierarchy represent sub-regions of the terrain;
generating a hierarchy of ID textures corresponding to the hierarchy of tiles, each ID texture in the hierarchy of ID textures corresponding to a tile in the hierarchy of tiles, wherein each ID texture in the hierarchy of ID textures is an image whose color values encode object identifiers of objects included in the corresponding tile in the hierarchy of tiles, including:
for each tile at one level above leaf tiles in the hierarchy of tiles, creating a respective ID texture for the tile including assigning a color value of each coordinate in the ID texture to a local object identifier of an object included in the tile at a location in the tile corresponding to the coordinate in the ID texture, and
for each tile at two or more levels above the leaf tiles in the hierarchy of tiles, creating a respective ID texture for the tile by sampling color values of ID textures in the hierarchy of ID textures that correspond to the respective tile's children tiles that are at one level below the respective tile;
generating, for each ID texture in the hierarchy of ID textures, an ID table of object identifiers for the ID texture, wherein the ID table of object identifiers maps each color value of the ID texture to a full object identifier;
receiving a selection of a pixel in a rendered view of the terrain;
identifying a tile in the hierarchy of tiles corresponding to the selected pixel;
identifying an ID texture in the hierarchy of textures corresponding to the identified tile;
obtaining a color value in the identified ID texture corresponding to the selected pixel; and
using the obtained color value as an index into an ID table of object identifiers for the ID texture to identify a full object identifier of a selected object in the plurality of objects.

17. The computer-readable storage device of claim 16, wherein creating the respective ID texture for the tile by sampling textures of the tile's children tiles comprises sampling, for each coordinate of the ID texture, one or more colors of the ID texture's children and selecting a single color of the one or more colors as the color for the coordinate of the ID texture.

18. The computer-readable storage device of claim 16, wherein generating an ID table of object identifiers for the ID texture comprises:
enumerating objects included in tiles corresponding to child ID textures of the ID texture; and
adding full object identifiers to the ID table of the ID texture for objects referenced by at least one pixel of the ID texture.

19. The computer-readable storage device of claim 16, wherein identifying an ID texture in the hierarchy of ID textures corresponding to the identified tile comprises:
obtaining a set of tiles selected by a terrain rendering engine for rendering the view of the terrain;
obtaining a plurality of ID textures corresponding to the set of tiles selected by the terrain rendering engine;
rendering a tile identifier buffer using the plurality of ID textures, wherein each tile in the tile identifier buffer is rendered uniformly in a distinct color that distinctly identifies a particular ID texture of the plurality of ID textures; and
determining a color in the tile identifier buffer that corresponds to the location of the selected pixel.

* * * * *